(12) United States Patent  (10) Patent No.: US 9,012,865 B2
Mahdessian et al.  (45) Date of Patent: Apr. 21, 2015

(54) RADIATION DETECTOR SYSTEM AND METHOD

(75) Inventors: Abraham Mahdessian, Ontario (CA); Adam Gregory Bogorodzki, Ontario (CA)

(73) Assignee: Canberra Industries, Inc., Meriden, CT (US)

( * ) Notice: Subject to any disclaimer, the term of this patent is extended or adjusted under 35 U.S.C. 154(b) by 434 days.

(21) Appl. No.: 13/461,184

(22) Filed: May 1, 2012

(65) Prior Publication Data

US 2013/0292578 A1  Nov. 7, 2013

(51) Int. Cl.
*H01J 47/00* (2006.01)
*B29C 45/14* (2006.01)

(52) U.S. Cl.
CPC ......... *H01J 47/002* (2013.01); *B29C 45/14336* (2013.01); *B29C 45/14426* (2013.01); *B29C 45/14639* (2013.01)

(58) Field of Classification Search
CPC .................................... G01T 1/17; G01T 7/00
USPC ............................................. 250/385.1, 395
See application file for complete search history.

(56) References Cited

U.S. PATENT DOCUMENTS

| | | | |
|---|---|---|---|
| 3,396,300 A * | 8/1968 | Bowyer | 313/93 |
| 4,543,483 A * | 9/1985 | Genrich | 250/374 |
| 7,470,913 B1 * | 12/2008 | Olshvanger et al. | 250/385.1 |
| 2003/0040877 A1 * | 2/2003 | Warburton et al. | 702/78 |
| 2006/0138340 A1 * | 6/2006 | Ianakiev et al. | 250/390.01 |
| 2013/0119261 A1 * | 5/2013 | McKinny et al. | 250/391 |

* cited by examiner

*Primary Examiner* — Christine Sung
(74) *Attorney, Agent, or Firm* — David W. Carstens; Kevin M. Klughart; Carstens & Cahoon, LLP

(57) ABSTRACT

A radiation detector system and method that significantly reduces the cost of conventionally constructed radiation detectors is disclosed. The disclosed system generally comprises an injection molded detector body incorporating plastic material with embedded feed-thrus that are encapsulated within the detector body. This detector body is mated to a detector window assembly using a gasket or other means of sealing to inhibit gas leakage. The mating methodology between the detector body and the detector window assembly is by means of plastic snap-on tabs in these structures that permit semi-permanent mating while also allowing the structures to be easily disassembled for repair and maintenance. The present invention system/method permits a significant hardware cost reduction as compared to conventional prior art radiation detector construction methodologies.

32 Claims, 18 Drawing Sheets

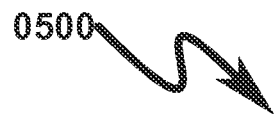
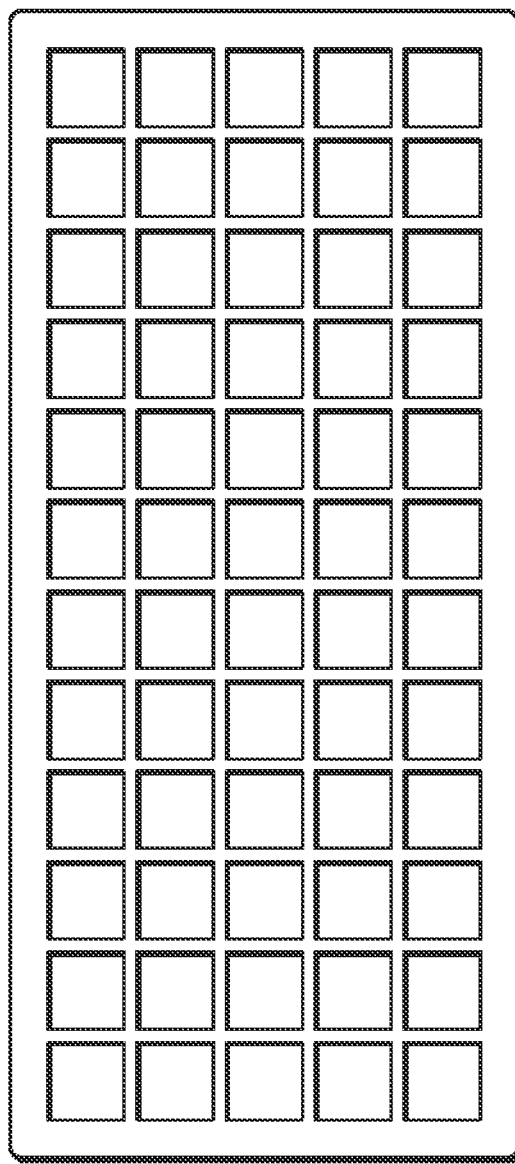
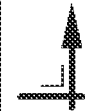

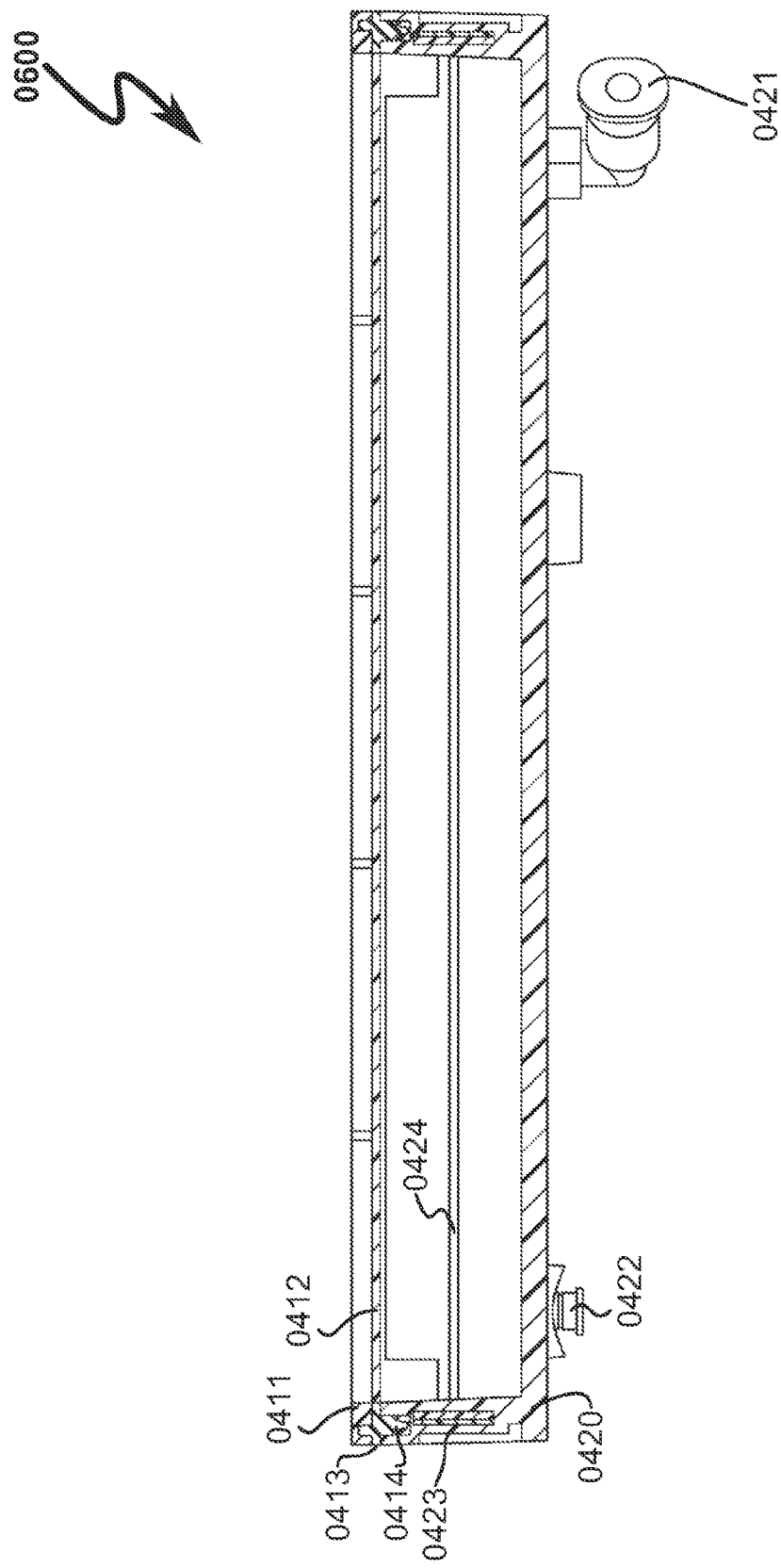

RADIATION DETECTOR SYSTEM AND METHOD

CROSS REFERENCE TO RELATED APPLICATIONS

Not Applicable

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to systems and methods for the detection of radiation, more particularly, but not by way of limitation, to the use of these devices in ionizing radiation detectors. While not limitive of the invention teachings, the present invention may in some circumstances be advantageously applied to categories including U.S. Patent Classification 250/385.1.

PRIOR ART AND BACKGROUND OF THE INVENTION

Prior Art System Overview (0100, 0200)

As generally seen in U.S. Pat. No. 7,470,913 for HIGH EFFICIENCY AND HIGH HOMOGENEITY LARGE-AREA GAS-FILLED RADIATION DETECTOR issued to Boris Olshvanger and Gregory Bogorodzki on Dec. 30, 2008 and reproduced in FIG. 1 (0100) and FIG. 2 (0200), a radiation detector may utilize a structure incorporating a detector body (0201), an anode arrangement (0202), and a window (0203) hermetically covering the detector body.

Deficiencies in the Prior Art

This prior art structure rectified several deficiencies in the then-known prior art regarding gas-filled large-area radiation detectors. However, the prior art as detailed above suffers from the following deficiencies:

A typical implementation of this prior art radiation detector requires a laser cut stainless steel grill frame that is very expensive to manufacture and prone to have sharp edges, a potential cause of pinhole failures in the MYLAR® film.

The use of multiple screws (18) to attach the stainless steel window to the aluminum body significantly adds to the production cost.

Gas feed-thrus (6 on one side and 3 on the opposite side) are individually installed and epoxy sealed onto the aluminum body, a time consuming manufacturing process.

In addition to extra labor, the epoxy sealant requires curing at elevated temperature which adds to the overall assembly time.

Leaks may occur in this structure, resulting in reduced production yield and requiring assembly rework.

Replacing the window in the field is cumbersome, and requires the application of sealant, resulting in an unwanted added cost to the end-user customer.

Gas leakages in this unit operationally increase costs and add to the carbon footprint of the overall system.

While some of the prior art may teach some solutions to several of these problems, the core issues of simultaneous cost reduction and reliability improvement in these prior art systems has not been addressed.

Objectives of the Invention

Accordingly, the objectives of the present invention are (among others) to circumvent the deficiencies in the prior art and affect the following objectives:

(1) Provide for a radiation detector system and method that permits easy assembly using a "snap on" type of attachment between the detector body and the detector window.

(2) Provide for a radiation detector system and method that may be fabricated using plastic injection molding manufacturing techniques.

(3) Provide for a radiation detector system and method that is significantly lower in cost as compared to the prior art.

(4) Provide for a radiation detector system and method that provides for easy and rapid field replacement of damaged detector windows, thus reducing field maintenance costs.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

System Overview

The present invention system generally comprises the following features:

An injection molded detector body, using suitably chosen engineered plastic.

Material with embedded feed-thrus that are encapsulated within the detector body.

To compensate for the differential coefficient of expansion between the plastic detector body material and FR4 feed-thru material, in some preferred embodiments a "serpentine" configuration is used for the multiple feed-thru per side elements.

A "snap on" means to easily attach/detach the detector window assembly from the detector body without any gas leakage, incorporating a gasket or another sealing means.

A locking mechanism to hold the detector window assembly in place, while simultaneously allowing it to be pried apart from the detector body for easy field replacement of the detector window.

Material selection (optimally plastic) with sufficient rigidity to prevent deformation of both detector window and detector body.

The present invention system may incorporate any selected combination of the above characteristics to achieve the overall design goals consistent with the objectives detailed above.

Method Overview

The system described above may be augmented by a radiation detection method utilizing the radiation detector system as described herein. This radiation detection method generally incorporates the use of a charge gathering device that accepts charge from the anode grid, modifies this charge envelope with a shaping amplifier, counts the resulting charge, and analyzes the resulting charge counts using various display and computational techniques well known by those skilled in the art. Integration of this and other preferred exemplary embodiment methods in conjunction with a variety of preferred exemplary embodiment systems described herein is anticipated by the overall scope of the present invention.

BRIEF DESCRIPTION OF THE DRAWINGS

For a fuller understanding of the advantages provided by the invention, reference should be made to the following detailed description together with the accompanying drawings wherein:

FIG. 5 illustrates a top view of a preferred embodiment of the present invention;

FIG. 6 illustrates a sectional view of a preferred embodiment of the present invention;

DESCRIPTION OF THE PRESENTLY PREFERRED EXEMPLARY EMBODIMENTS

Figure 1:
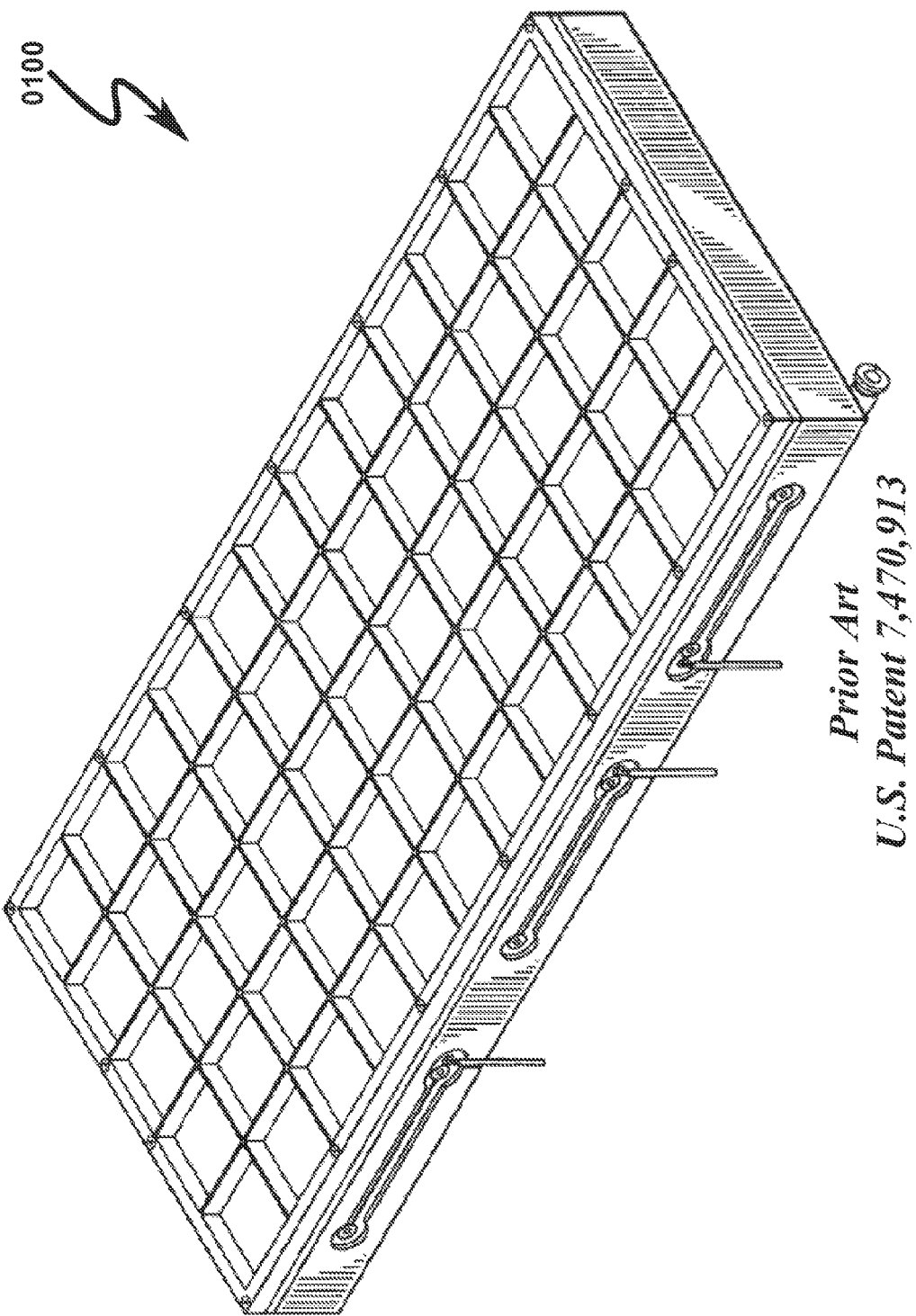
FIG. 1 illustrates a prior art radiation detector system.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a RADIATION DETECTOR SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Glue not Limitive

The present invention anticipates a wide variety of materials may be utilized as a "gluing agent" to fabricate the overall structure of the disclosed system. The present invention makes no limitation on the type of glue or adhesive that may be used to affect this fixing function.

FR-4 not Limitive

The invention scope is not limited by the use of FR-4 glass-reinforced epoxy laminate sheets in some embodiments.

MYLAR® Film not Limitive

The present invention anticipates a wide variety of materials may be utilized to fabricate the overall structure of the disclosed system. In many preferred embodiments MYLAR® film may be used within the detector window assembly to both seal the window and permit entry of radiation for detection by the enclosed anode wires. The present invention is not limited to the use of MYLAR® film in this invention element, as this is merely a preferred construction material.

Plastic not Limitive

The present invention anticipates a wide variety of materials may be utilized to fabricate the overall structure of the disclosed system. In many preferred embodiments various forms of plastic may be used as the base construction material, especially in situations where the system is manufactured using injection mold techniques. Within this context, the term "plastic" should be given its widest possible interpretation consistent with the mechanical teachings of the present invention.

Sufficient Rigidity not Limitive

The present invention specifies in some preferred exemplary embodiments that the plastic structures formed have sufficient rigidity with minimum warping to act as radiation detectors in an application environment. One skilled in the art will recognize that this requirement will depend heavily on the application environment and type of plastic used in construction and therefore this is deemed an application specific parameter that one skilled in the art will select at the time of construction with respect to plastic thickness based on plastic selection type.

Exemplary System Embodiment Overview (0300)

Figure 3:
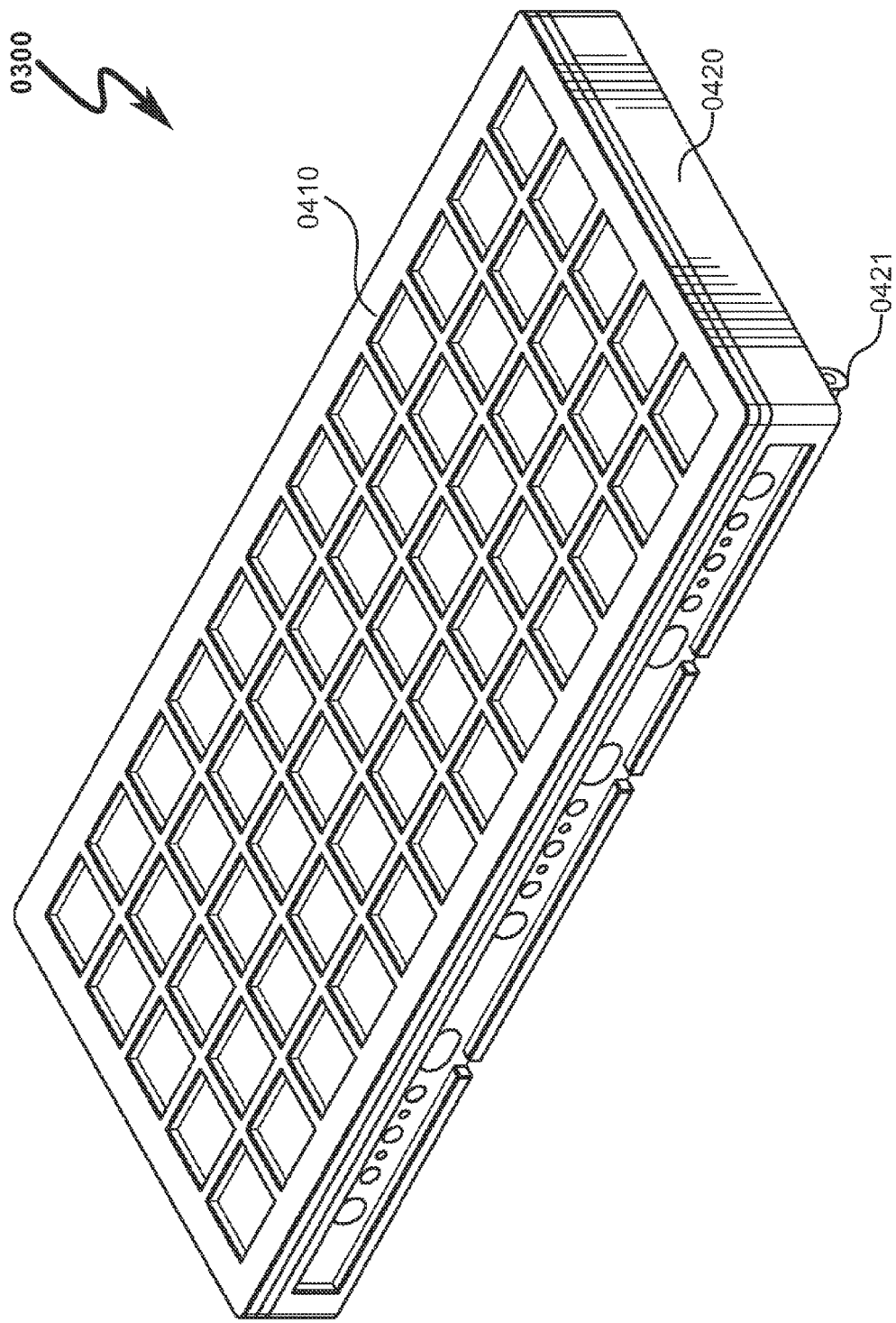
FIG. 3 illustrates an isometric view of a preferred embodiment of the present invention.

A preferred exemplary system embodiment is generally illustrated in FIG. 3 (0300) wherein the radiation detector incorporates a protective plastic cover (0410) mated to a housing (0420) that incorporates a gas fitting (0421).

Exemplary System Embodiment Assembly (0400)

While the external appearance of the system as detailed in FIG. 3 (0300) is similar to that of the prior art system depicted in FIG. 1 (0100), configuration and construction details are significantly different.

Figure 4:
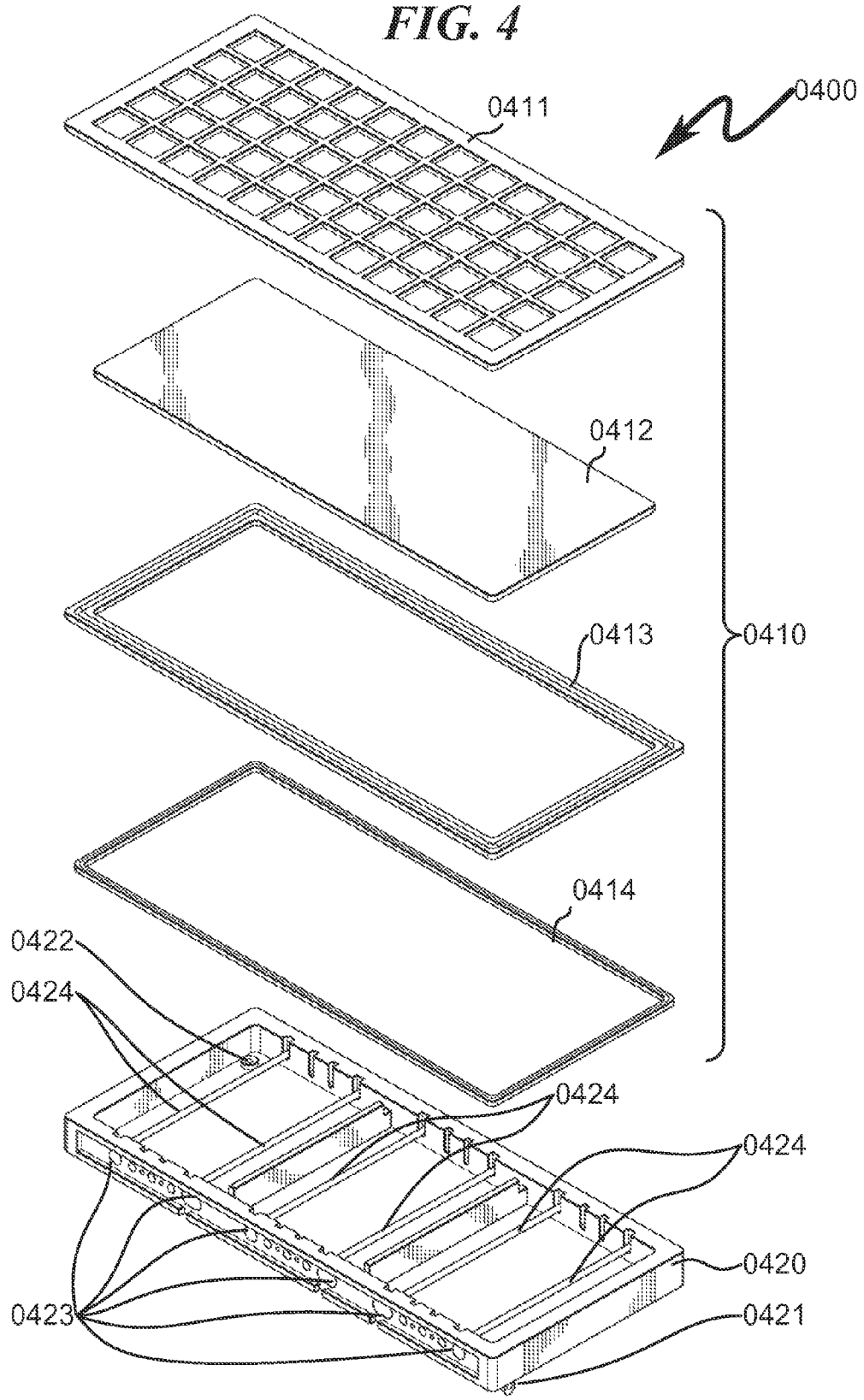
FIG. 4 illustrates assembly view of a preferred embodiment of the present invention.

An exemplary system embodiment assembly view is generally illustrated in FIG. 4 (0400) wherein the radiation detector incorporates a detector window assembly (0410) and a detector housing (0420). The detector window assembly further comprises a protective grid cover (0411), a MYLAR® film (0412) (usually metalized), window retention bezel (0413), and gasket seal (0414). The detector housing (0420) incorporates a gas supply fitting (0421), threaded insert for preamplifier mounting (0422), feed-thrus for anode wires (0423), and anode wires (0424) that extend across opposite sides of the detector housing.

The assembly of the present invention makes use of sealing detents within the protective grid cover (0411) and detector housing (0420) to enable the MYLAR® film (0412) to be retained in a gas-tight configuration to the detector housing (0420) without the need for additional fasteners. This configuration also permits maintenance of the assembled detector without the need for special tools or test fixtures.

Exemplary System Cross Section Detail (0500, 0600)

Further detail of an exemplary system embodiment is generally illustrated in the top view of FIG. 5 (0500) and the corresponding sectional view of FIG. 6 (0600). Referencing FIG. 6 (0600), the detector housing (0420) is broadly illustrated showing the gas supply fitting (0421), threaded preamplifier mounting insert (0422), anode wire feed-thru (0423), and anode wire (0424). Features of the detector window assembly (0410) including the window cover (0411), MYLAR® film (0412), window retention bezel (0413), and gasket seal (0414) are also illustrated in cross section.

Detector Window/Retention Bezel Detail (0700, 0800, 0900)

Figure 7:
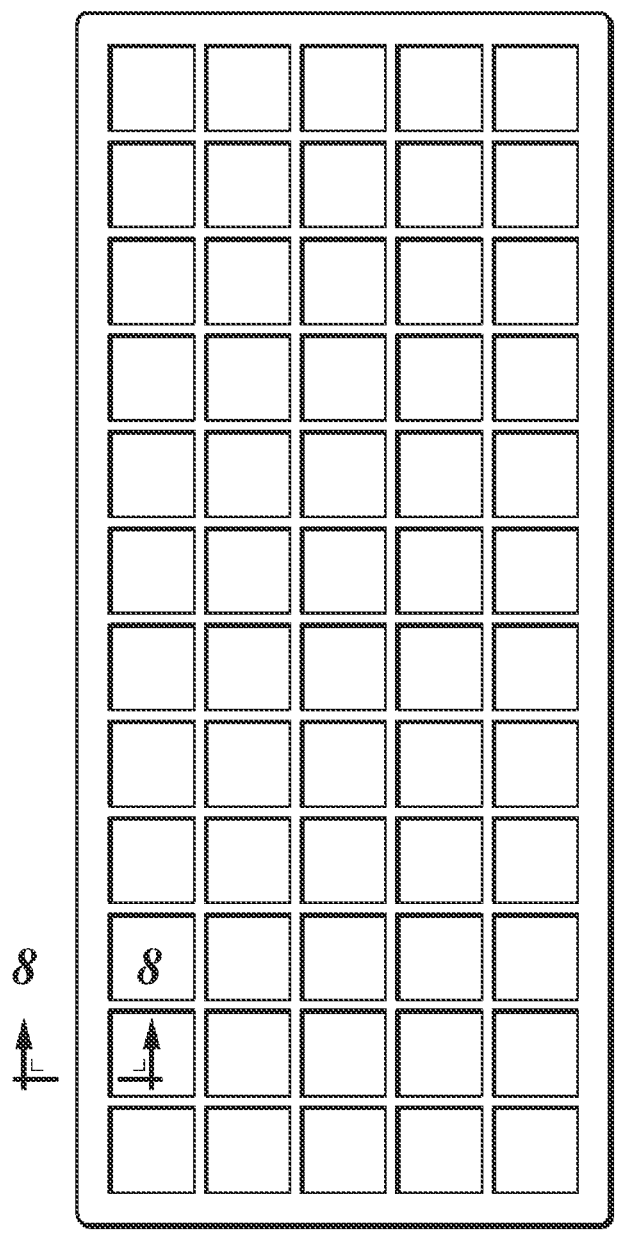
FIG. 7 illustrates a top view of the baseline drawing used as a basis for illustrating the tongue-and-groove design used in some preferred embodiments of the present invention.
Figure 8:
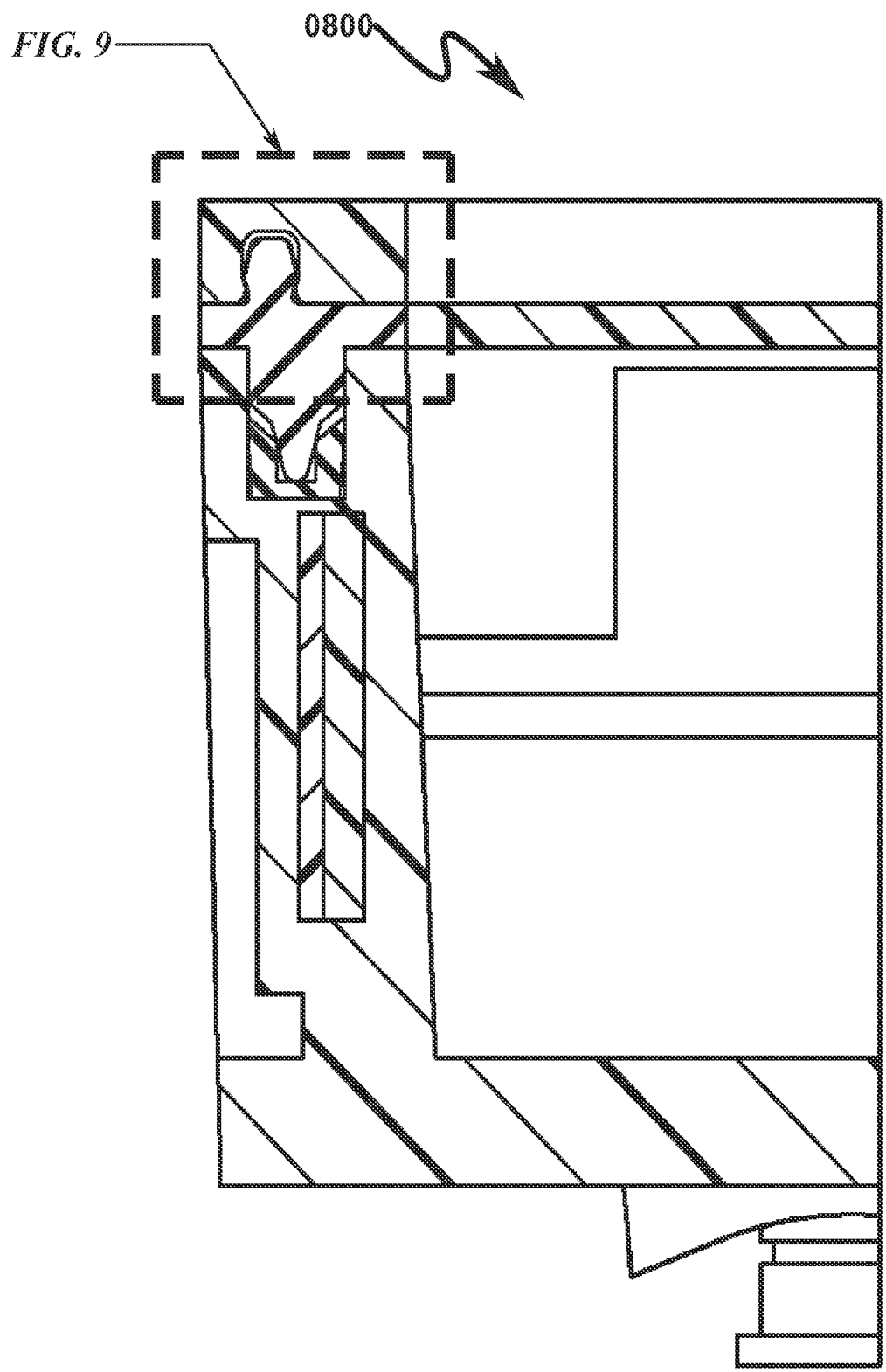
FIG. 8 illustrates a sectional view illustrating the location of the grill assembly used in some preferred embodiments of the present invention.
Figure 9:
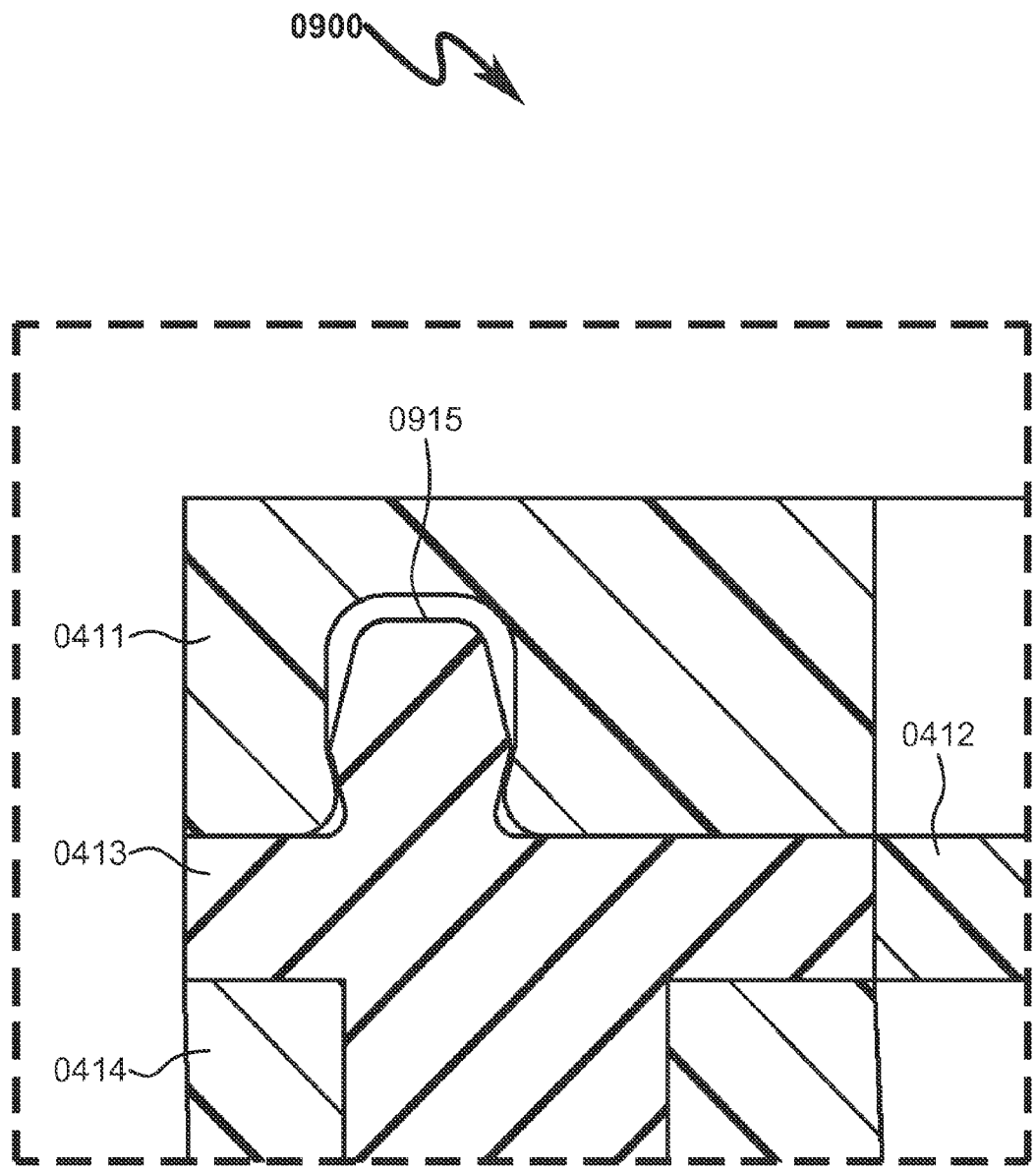
FIG. 9 illustrates an expanded sectional view of the grill assembly used in some preferred embodiments of the present invention, showing the tongue-and-groove design of the two pieces that comprise the grill.

An expanded detail of an exemplary system embodiment showing details of the detector window/retention bezel interface is generally illustrated in the top view of FIG. 7 (0700), the corresponding sectional view of FIG. 8 (0800), and the expanded detail of FIG. 9 (0900). Referencing FIG. 9 (0900) it can be seen that the detector cover (0411) snaps into the window retention bezel (0413) retaining the MYLAR® film (0412) in place. The gasket seal (0414) forms an air-tight interface to the detector housing (0420). Note in some configurations the MYLAR® film (0412) may be retained within the gap (0915) between the detector window frame (0411) and the window retention bezel (0413).

Retention Bezel/Gasket Seal Detail (1000, 1100, 1200)

Figure 10:
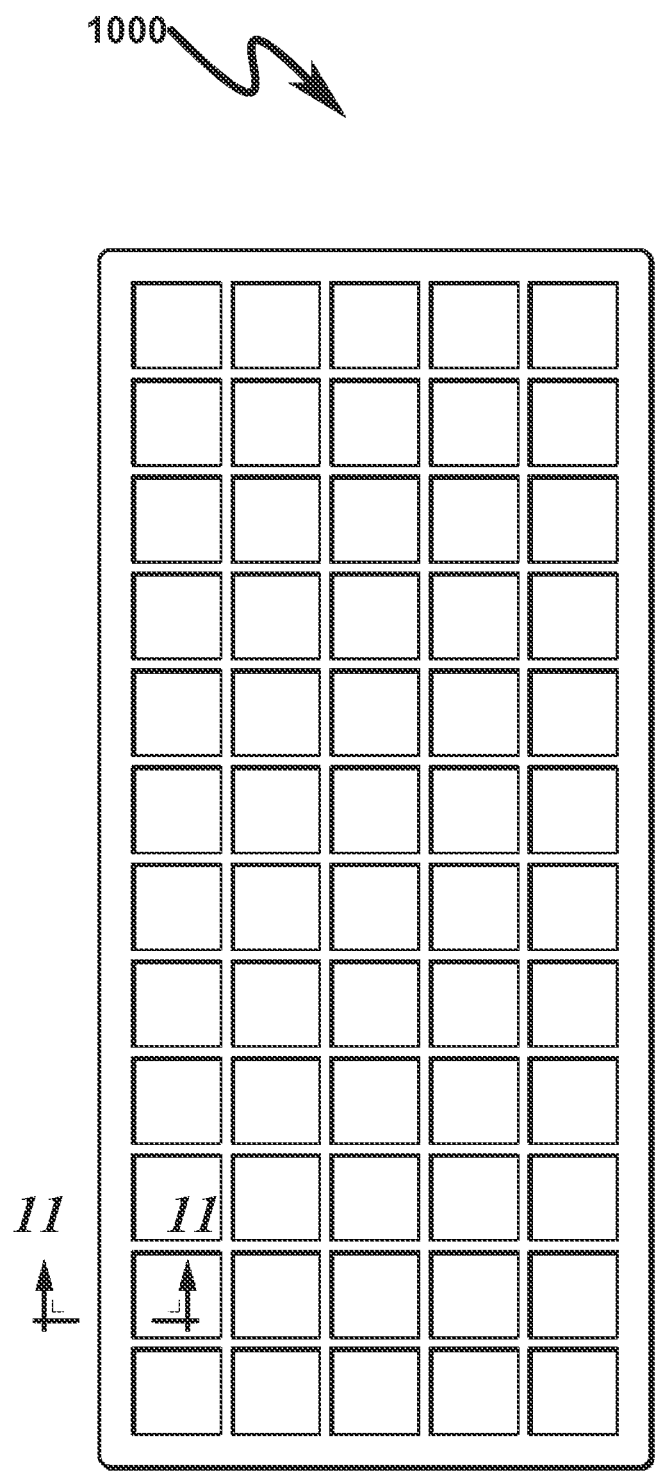
FIG. 10 illustrates a top view of the baseline drawing used as a basis for illustrating the tongue-and-groove design integration used in some preferred embodiments of the present invention.
Figure 11:
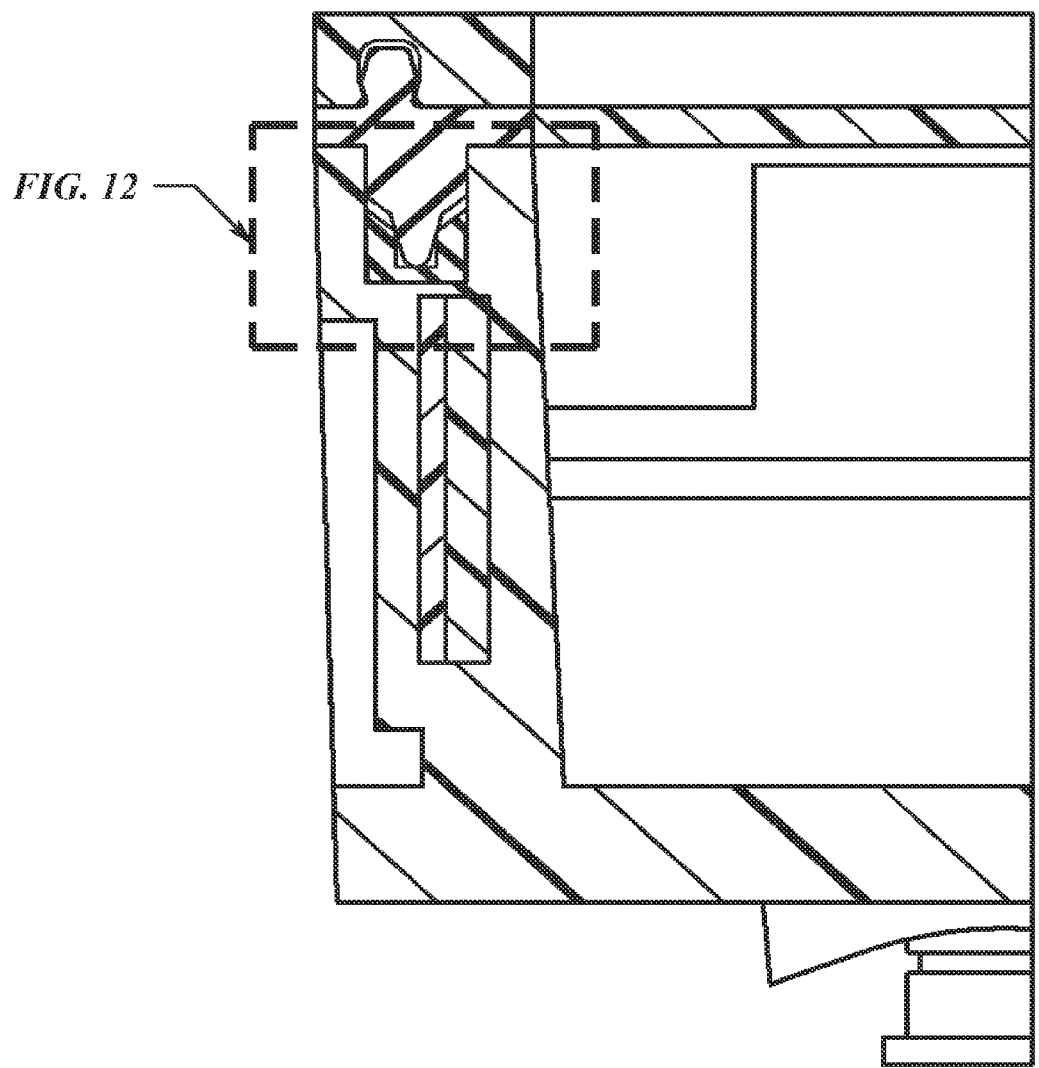
FIG. 11 illustrates a sectional view illustrating the location of the tongue-and-groove integration used in some preferred embodiments of the present invention.
Figure 12:
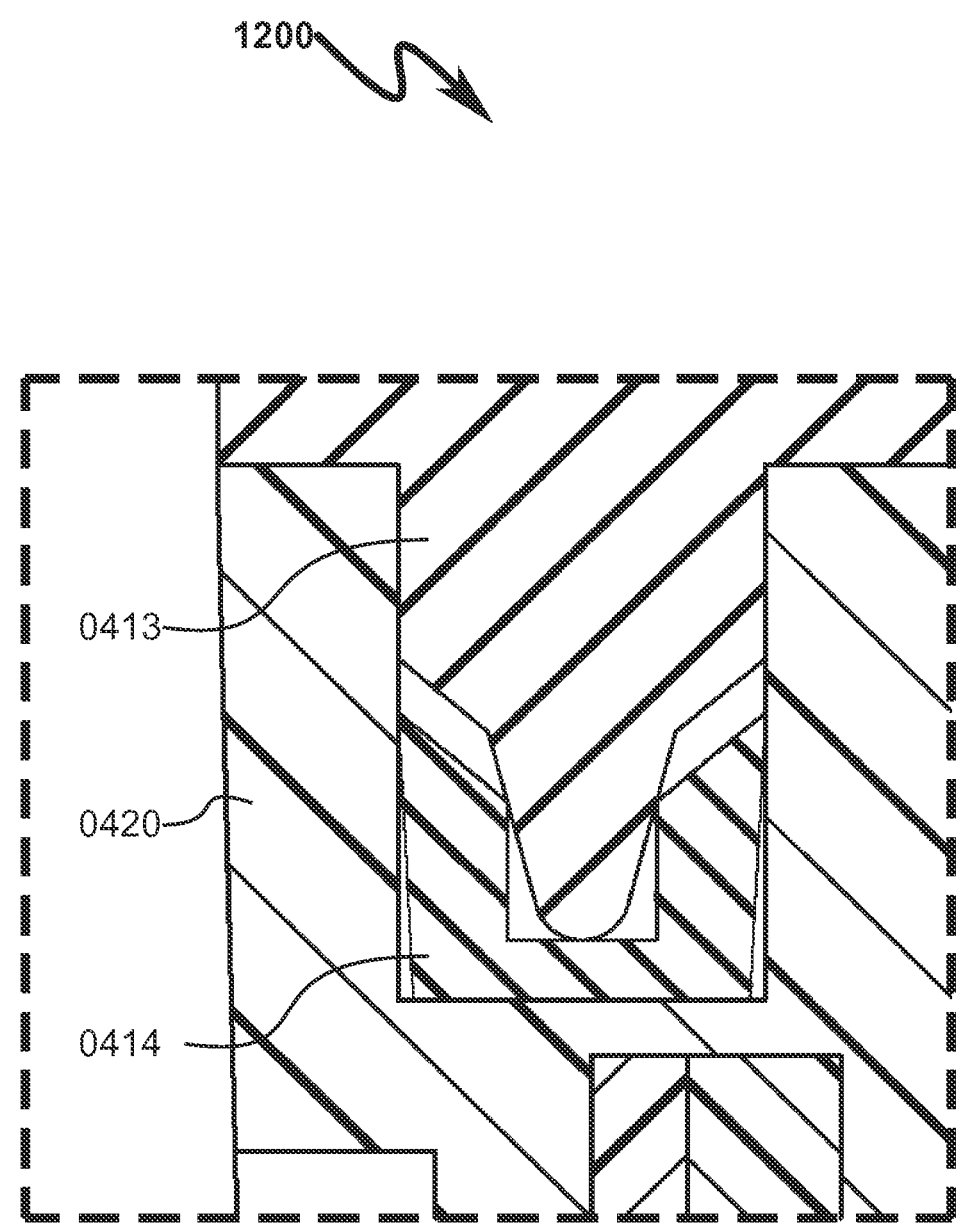
FIG. 12 illustrates an expanded sectional view of a preferred exemplary embodiment and shows the integration of the grill and detector body tongue-and-groove design.

An expanded detail of an exemplary system embodiment showing details of the retention bezel/gasket seal interface is generally illustrated in the top view of FIG. 10 (1000), the corresponding sectional view of FIG. 11 (1100), and the expanded detail of FIG. 12 (1200). Here it can be seen that the window retention bezel (0413) fits into the detector housing (0420) via use of a gasket seal (0414) that forms an air-tight interface to the detector housing (0420).

System Description

The design consists of two subassemblies. The first assembly is the detector housing with feed-thrus over-molded to create a pre-existing seal as generally illustrated in FIG. 4 (0420). The second is the MYLAR® window assembly in FIG. 4 (0410). The two components are designed to snap fit together in as generally illustrated in FIG. 8 (0800) and FIG. 11 (1100). The sealing interfaces are generally illustrated in FIG. 9 (0900) and FIG. 12 (1200), with the gasket seal being illustrated in FIG. 4 (0414). This configuration permits rapid assembly/disassembly without the need for any special tooling.

The MYLAR® window consists of a sandwiched design, where the plastic grill in FIG. 4 (0410) has a groove in which the MYLAR® in FIG. 9 (0412) is adhered too, which also allows for the perimeter border in FIG. 9 (0915) tongue to be inserted into for final adhesion with glue or other adhesive. The tongue and groove design is designed in such a way to allow for very minimal glue to be applied to retain the MYLAR® in place.

Figure 13:
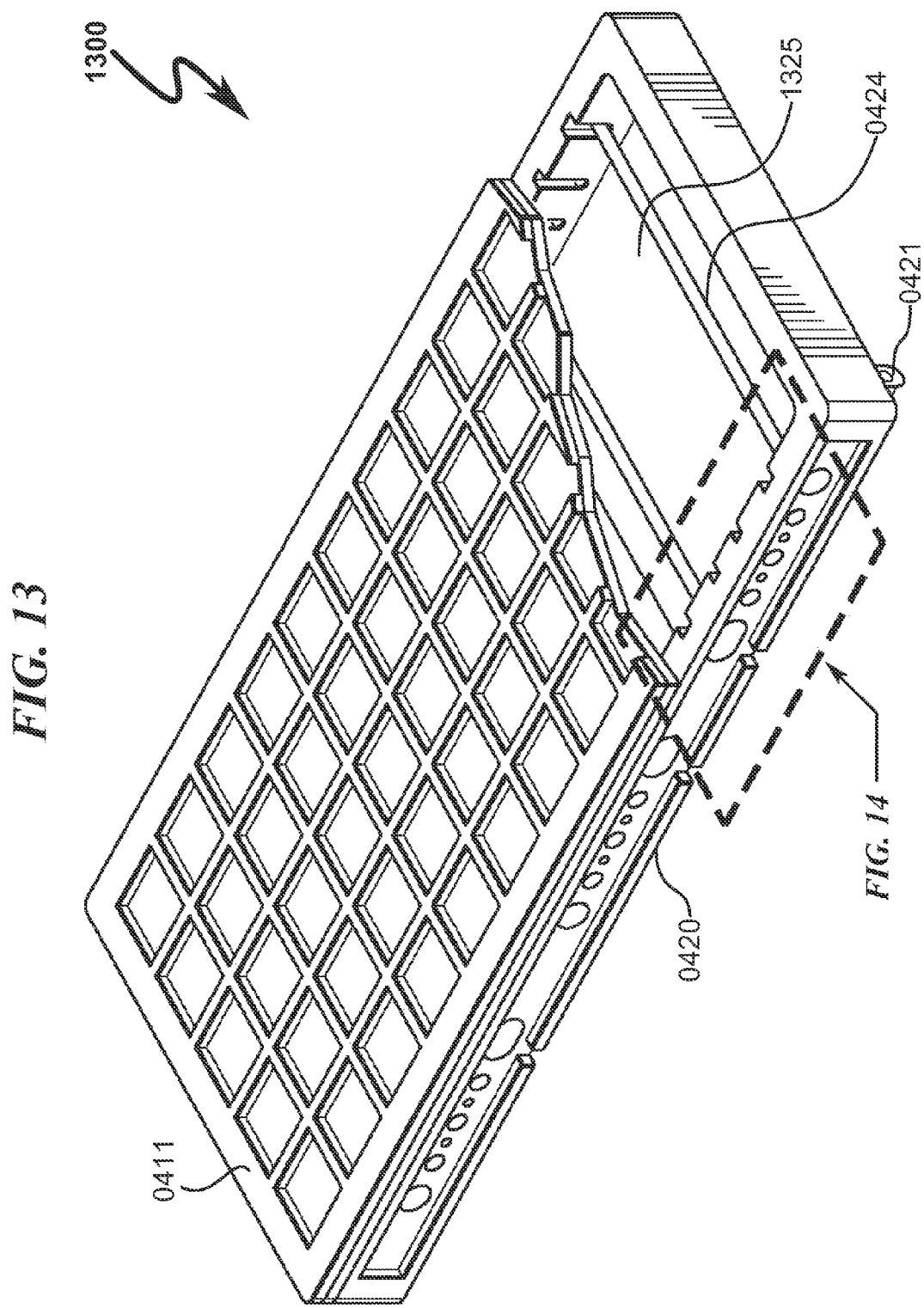
FIG. 13 illustrates a baseline view for an exemplary detector assembly and a breakout view to illustrate an embodiment wherein the interior surface of the detector body is coated with a conductive coating.
Figure 14:
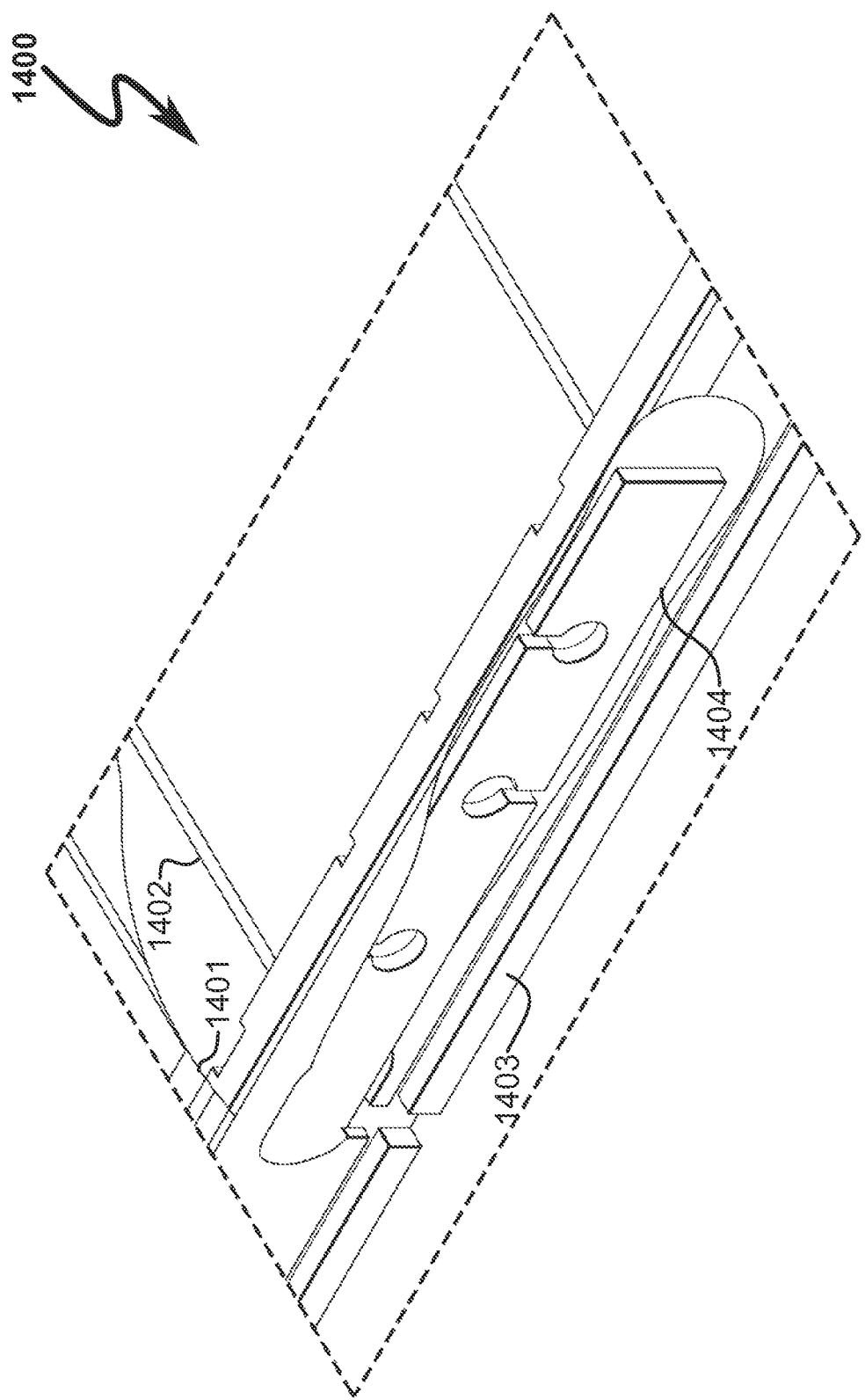
FIG. 14 illustrates a breakout view of an exemplary detector assembly, showing the embedded (over-molded) serpentine feed-thru design elements.

The detector body as generally illustrated in FIG. 13 (1303) and FIG. 14 (1303) will typically have the feed-thrus in FIG. 4 (0423) over-molded (encapsulated) within the plastic to create an existing seal. The feed-thrus are inserted into the tooling allowing the plastic to flow around it and creating a seal in the manufacturing process. The detector body in FIG. 6 (0420) also consists of two threaded inserts in FIG. 6 (0600) that are over-molded to install the 90 degree elbows in FIG. 4 (0421) to allow for the gas to flow through the assembled detector when finally installed within a monitoring unit.

The gasket material in FIG. 4 (0414) will be made from a silicon based elastomer that will withstand temperature fluctuations and multiple number of installations and uninstallations. Preferred materials that may be used in some preferred embodiments include ABS plastic for the detector body and the MYLAR® window components. A silicon based elastomer for the gasket seal around the perimeter of the detector body is preferred. A nickel based conductive layer painted on the interior surface in FIG. 13 (1325) of the detector may also act as a grounding surface.

The MYLAR® window is fragile as a single component. Once the MYLAR® window is installed on the detector body, it is rigid enough to minimize natural tendencies of warping of the plastic.

Figure 15:
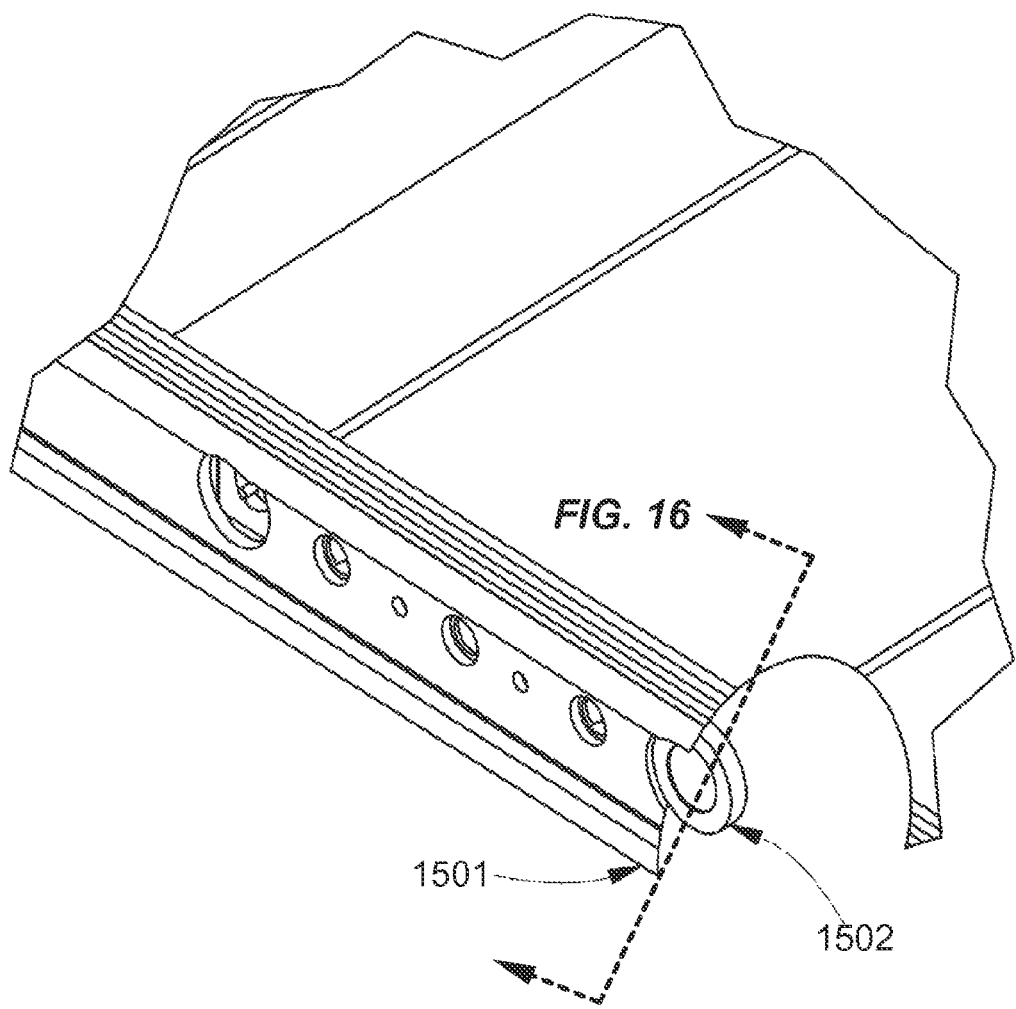
FIG. 15 illustrates a perspective view of an exemplary detector assembly showing typical alternative over-molded feed-thru design elements.
Figure 16:
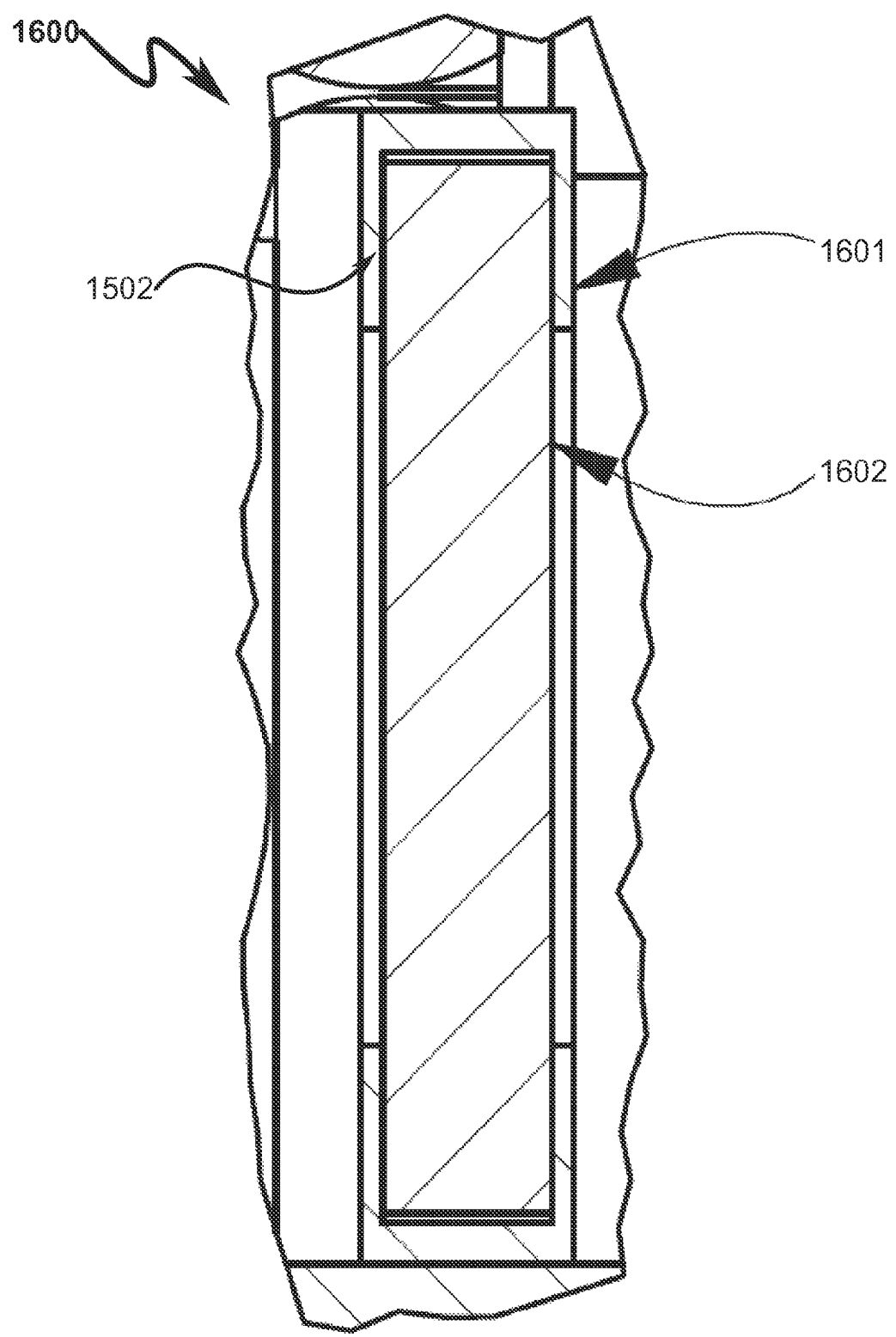
FIG. 16 illustrates a sectional view of an exemplary detector assembly showing a typical alternative over-molded feed-thru design element cross section.

The fiberglass feed-thru serpentine design in FIG. 14 (1404) is designed in such a way to provide additional structural support while filling in the empty voids within the plastic. Circular feed-thrus as generally illustrated in FIG. 15 (1502) are also anticipated to be used in combination on the alternate side to increase the volume of ABS on the detector body walls. The perspective views of FIG. 13 (1300) and FIG. 15 (1500) along with the respective detailed sectional views of FIG. 14 (1400) and FIG. 16 (1600) illustrate that the present invention may incorporate a wide variety of methodologies to implement the feed-thrus within the detector housing body.

An alternative preferred method of installing the feed-thru would be to over mold a round feed-thru individually. In this configuration the plastic rim encompasses the feed-thru around the fiberboard which will allow the subassembly to adhere to the plastic detector body. This provides consistent placement of the feed-thrus while still allowing the detector body to keep the structural integrity intact to minimize the deflection of the detector body.

System Application Context (1700)

Figure 17:
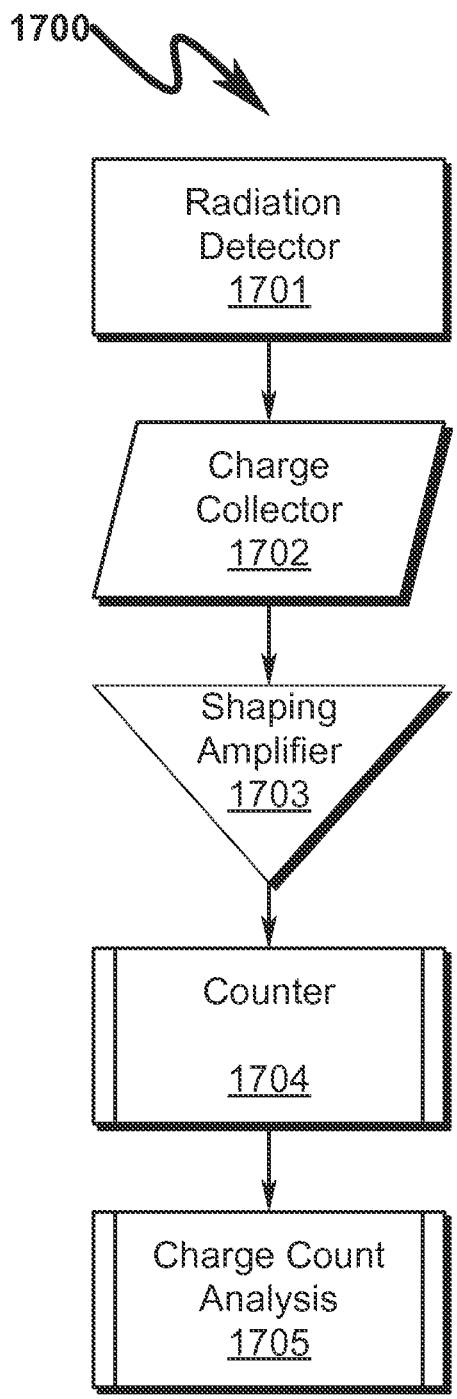
FIG. 17 illustrates an exemplary system context in which the present invention may be utilized to affect a radiation detection system.

The present invention may be utilized in the context of an overall radiation detection system as generally illustrated in FIG. 17 (1700), wherein the radiation detector system (1701) described previously is connected to a charge collection device (1702) to collect charge from the anode grid array. The output of the charge collection device (1702) is fed into a shaping amplifier (1703) that produces a modified voltage in response to the collected charge. This modified voltage is then interpreted by a counter (1704) to generate a charge count. The charge count can then be analyzed (1705) using a variety of prior art display and/or analysis techniques.

System Summary

The present invention system anticipates a wide variety of variations in the basic theme of construction, but can be generalized as a radiation detector system comprising:
(a) detector window assembly;
(b) detector body; and
(c) anode wires;
wherein
the anode wires are installed under tension from one side of the detector body to the opposing side of the detector body;
the anode wires are electrically isolated from the detector body via electrical feed-thrus;
the electrical feed-thrus are aligned and encapsulated in the opposing sides of the detector body;
the detector window and the detector body mate with each other; and
the detector window and the detector body mate with a gas leakage prevention gasket seal located at the mating interface between the detector window and the detector body.

This general system summary may be augmented by the various elements described herein to produce a wide variety of invention embodiments consistent with this overall design description.

Method Summary (1800)

Figure 18:
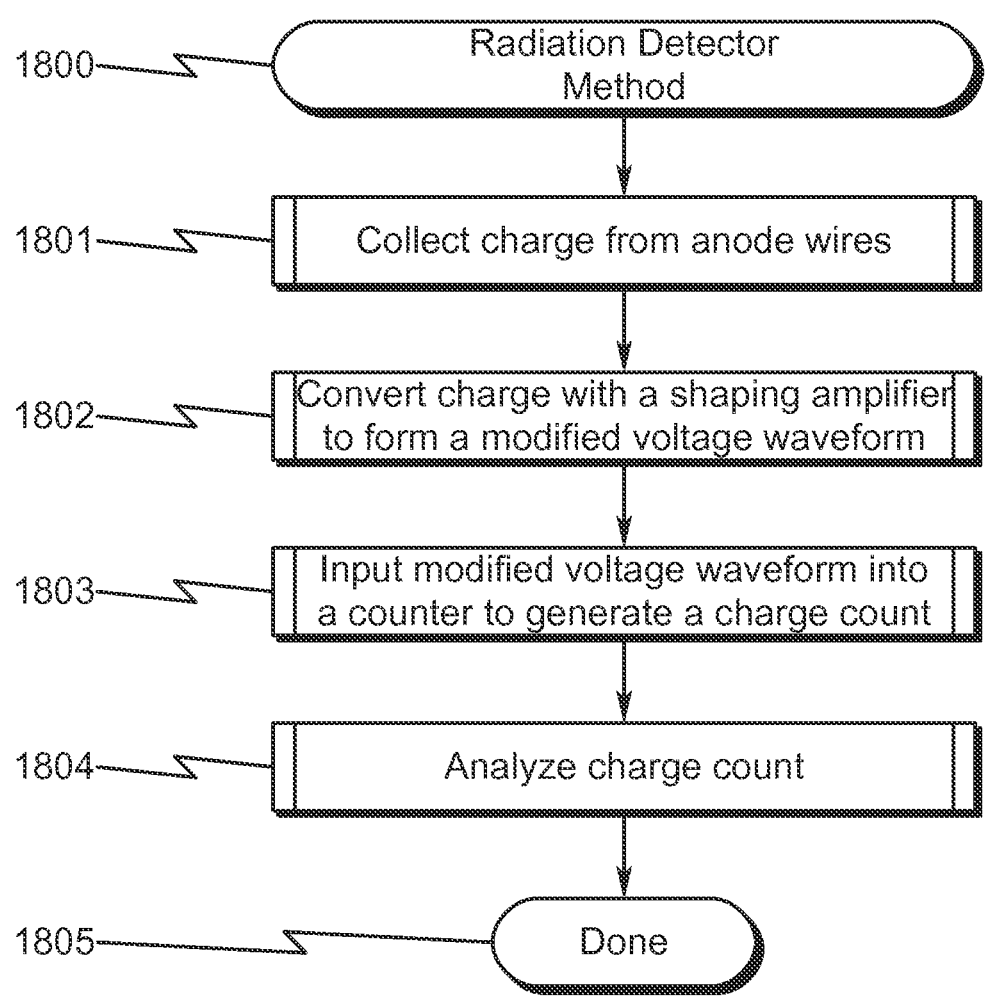
FIG. 18 illustrates a preferred exemplary embodiment of a radiation detection method utilizing the disclosed radiation detection system.

The present invention method anticipates a wide variety of variations in the basic theme of implementation, but can be generalized as a radiation detector method as illustrated in the flowchart of FIG. 18 (1800), the method operating in conjunction with a radiation detector system comprising:
(a) detector window assembly;
(b) detector body; and
(c) anode wires;
wherein
the anode wires are installed under tension from one side of the detector body to the opposing side of the detector body;
the anode wires are electrically isolated from the detector body via electrical feed-thrus;
the electrical feed-thrus are aligned and encapsulated in the opposing sides of the detector body;
the detector window and the detector body mate with each other; and
the detector window and the detector body mate with a gas leakage prevention gasket seal located at the mating interface between the detector window and the detector body;
wherein the method comprises the steps of:
(1) collecting charge from the anode wires (1801);
(2) converting the charge with a shaping amplifier to form a modified voltage waveform (1802);
(3) inputting the modified voltage waveform into a counter to generate a charge count (1803); and
(4) analyzing the charge count (1804).

Note that the charge count analysis may incorporate displays, audible alarms, or other type of human interfaces in conjunction with data logging and/or mathematical analysis of the collected charge count. This general method summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:
An embodiment wherein the detector window assembly further comprises an injection molded frame, the frame comprising plastic material selected to minimize warping and be sufficiently rigid to form a gas-tight seal with the detector body.
An embodiment further comprising one or more layers of MYLAR® film glued onto the frame.
An embodiment further comprising metalized MYLAR® film attached to the frame.
An embodiment further comprising one or more layers of MYLAR® film glued onto the frame.
An embodiment wherein the frame comprises an open cell construction.

An embodiment wherein the detector body is fabricated by injection molding incorporating sufficient structural integrity to hold the anode wires in place under tension.

An embodiment wherein the anode wires are electrically isolated from the detector body.

An embodiment wherein the detector body has one or more of its surfaces metalized to ensure a uniform electric field within the cavity of the detector body.

An embodiment wherein the surfaces the inner surfaces of the detector body.

An embodiment wherein the feed-thrus are organized in a serpentine configuration.

An embodiment wherein the feed-thrus are organized to compensate for the differential coefficient of expansion between the materials of the feed-thrus and the material of the detector body.

An embodiment wherein the feed-thrus comprise FR-4 glass-reinforced epoxy laminate sheets.

An embodiment wherein the feed-thrus comprise annular rings of insulating material.

An embodiment wherein the feed-thrus comprise annular rings of FR-4 glass-reinforced epoxy laminate.

An embodiment wherein the detector window comprises a window support/protective frame, detector window film, window retention bezel, and gasket seal.

One skilled in the art will recognize that other embodiments are possible based on combinations of elements taught within the above invention description.

System Advantages

Sub-Assembly Minimization

Figure 2:
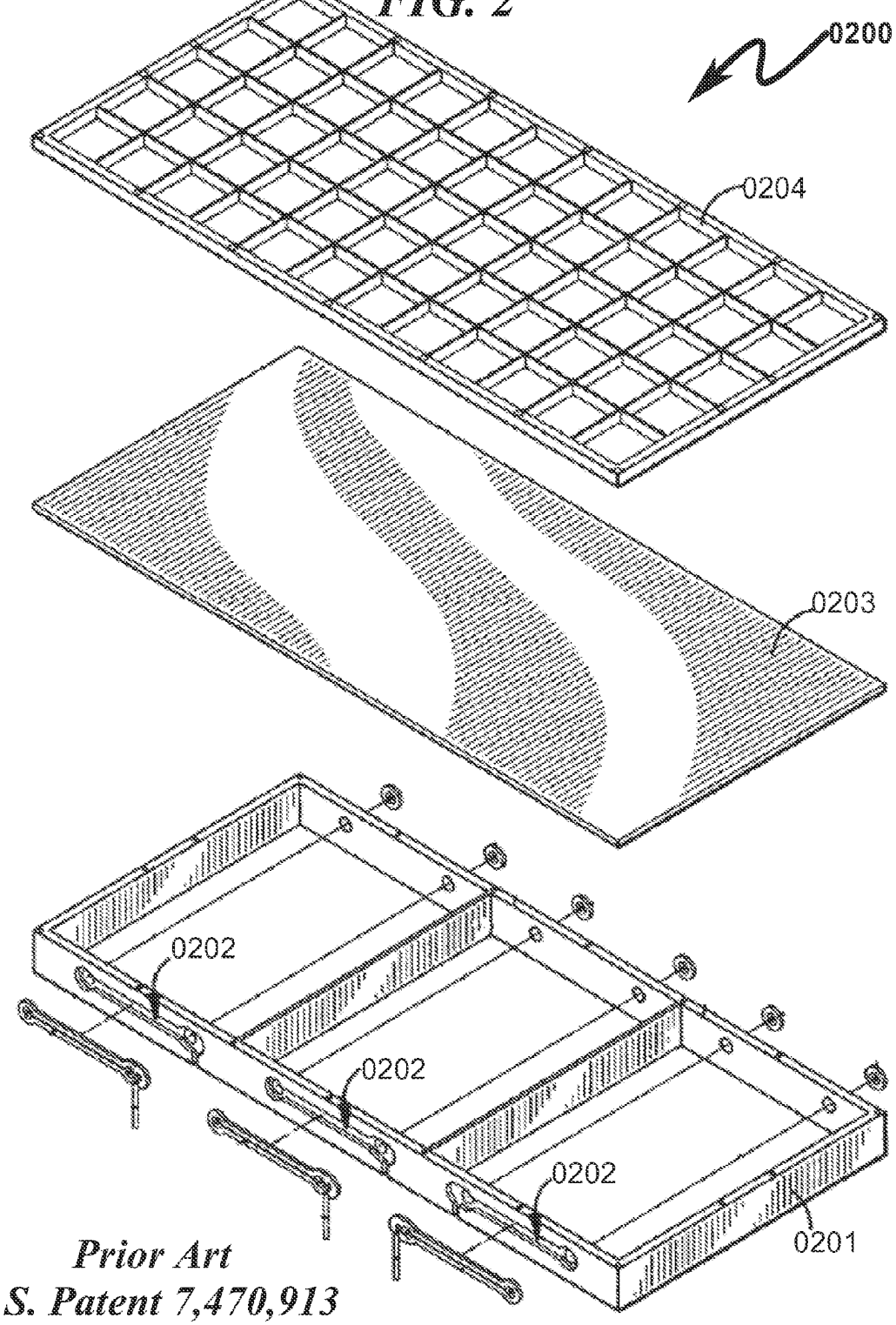
FIG. 2 illustrates a detailed assembly view of a prior art radiation detector system.

A major improvement of the present invention as compared to the prior art system designs is the minimization of sub-assemblies and assembly processes. The prior art invention detector bodies require a special oven for curing the adhesive used to apply the feed-thrus to the aluminum body in the locations shown in FIG. 2 (0202). This process also needs to be repeated twice for single side application at a time. This process is eliminated by utilizing the over-molded feed-thru design detailed in the present invention.

Detector Grill Assembly

Also, the prior art design uses an assembly of 18 small screws that are used to install the detector grill to make up the detector window. This is a cumbersome process and could also result in tears on the MYLAR® window if not assembled carefully. This assembly process is eliminated, and risk of damaging the MYLAR® window is removed by producing detector windows with the adhesive and the plastic perimeter border and grill.

Cost Savings

As mentioned previously one of the potential advantages of the present invention in some embodiments is significant cost savings as compared to designs taught by the prior art. Estimated material/assembly cost savings for the present invention approach 55% as compared to the prior art using some of the preferred exemplary configurations as taught herein.

CONCLUSION

A radiation detector system and method that significantly reduces the cost of conventionally constructed radiation detectors has been disclosed. The disclosed system generally comprises an injection molded detector body incorporating plastic material with embedded feed-thrus that are encapsulated within the detector body. This detector body is mated to a detector window assembly using a gasket or other means of sealing to inhibit gas leakage. The mating methodology between the detector body and the detector window assembly is by means of plastic snap-on tabs in these structures that permit semi-permanent mating while also allowing the structures to be easily disassembled for repair and maintenance. The present invention system/method permits a significant hardware cost reduction as compared to conventional prior art radiation detector construction methodologies.

What is claimed is:

1. A radiation detector system comprising:
   (a) detector window assembly (DWA);
   (b) detector housing body (DHB); and
   (c) anode wires;
   wherein
   said anode wires are installed under tension from one side of said DHB to the opposing side of said DHB;
   said anode wires are electrically isolated from said DHB via electrical feed thrus;
   said DHB is constructed of a non-metallic material comprising injection molded plastic;
   said DWA comprises a separate window support/protective frame (WSPF), detector window film, window retention bezel, and a gas leakage prevention gasket seal;
   said WSPF is constructed of injection molded plastic material;
   said DWA and said DHB mate with each other using a "snap fit" means for attachment;
   said WSPF snaps into said window retention bezel and thereby retains said detector window film in place between said WSPF and said window retention bezel; and said DWA and said DHB mate with said gas leakage prevention gasket seal that is located at the mating interface between said DWA and said DHB.

2. The radiation detector system of claim 1 wherein said WSPF injection molded plastic material is selected to minimize warping and be sufficiently rigid to form a gas-tight seal with said DHB.

3. The radiation detector system of claim 2 further comprising one or more layers of biaxially-oriented polyethylene terephthalate (BoPET) film adhesively attached to said WSPF.

4. The radiation detector system of claim 3 further comprising metalized biaxially-oriented polyethylene terephthalate (BoPET) film attached to said WSPF.

5. The radiation detector system of claim 3 further comprising one or more layers of biaxially-oriented polyethylene terephthalate (BoPET) film glued onto said WSPF.

6. The radiation detector system of claim 5 wherein said WSPF comprises an open cell construction.

7. The radiation detector system of claim 1 wherein said DHB is fabricated by injection molding incorporating sufficient structural integrity to hold said anode wires in place under tension.

8. The radiation detector system of claim 7 wherein said anode wires are electrically isolated from said DHB.

9. The radiation detector system of claim 1 wherein said detector body has one or more of its surfaces metalized to ensure a uniform electric field within the cavity of said DHB.

10. The radiation detector system of claim 9 wherein said surfaces comprise the inner surfaces of said DHB.

11. The radiation detector system of claim 1 wherein said feed-thrus are organized in a serpentine configuration.

12. The radiation detector system of claim 1 wherein said feed-thrus are organized to compensate for the differential coefficient of expansion between the materials of said feed-thrus and the material of said DHB.

13. The radiation detector system of claim 1 wherein said feed-thrus comprise FR-4 glass-reinforced epoxy laminate sheets.

14. The radiation detector system of claim 1 wherein said feed-thrus comprise annular rings of insulating material.

15. The radiation detector system of claim 1 wherein said feed-thrus comprise annular rings of FR-4 glass-reinforced epoxy laminate.

16. The radiation detector system of claim 1 wherein said detector body comprises a gas supply fitting and threaded insert configured for preamplifier mounting.

17. A radiation detector method, said method operating in conjunction with a radiation detector system, said system comprising:
(a) detector window assembly (DWA);
(b) detector housing body (DHB); and
(c) anode wires;
wherein
said anode wires are installed under tension from one side of said DHB to the opposing side of said DHB;
said anode wires are electrically isolated from said DHB via electrical feed-thrus; said electrical feed-thrus are aligned and encapsulated in said opposing sides of said DHB;
said DHB is constructed of a non-metallic material comprising injection molded plastic;
said DWA comprises a separate window support/protective frame (WSPF), detector window film, window retention bezel, and gas leakage prevention gasket seal;
said WSPF is constructed of injection molded plastic material; said DWA and said DHB mate with each other using a "snap fit" means for attachment;
said WSPF snaps into said window retention bezel and thereby retains said detector window film in place between said WSPF and said window retention bezel; and
said DWA and said DHB mate with said gas leakage prevention gasket seal that is located at the mating interface between said DWA and said DHB;
wherein said method comprises the steps of:
(1) collecting charge from said anode wires;
(2) converting said charge with a shaping amplifier to form a modified voltage waveform;
(3) inputting said modified voltage waveform into a counter to generate a charge count; and
(4) analyzing said charge count.

18. The radiation detector method of claim 17 wherein said WSPF injection molded plastic material is selected to minimize warping and be sufficiently rigid to form a gas-tight seal with said DHB.

19. The radiation detector method of claim 18 further comprising one or more layers of biaxially-oriented polyethylene terephthalate (BoPET) film adhesively attached to said WSPF.

20. The radiation detector method of claim 19 further comprising metalized biaxially-oriented polyethylene terephthalate (BoPET) film attached to said WSPF.

21. The radiation detector method of claim 19 further comprising one or more layers of biaxially-oriented polyethylene terephthalate (BoPET) film glued onto said WSPF.

22. The radiation detector method of claim 21 wherein said WSPF comprises an open cell construction.

23. The radiation detector method of claim 17 wherein said DHB is fabricated by injection molding incorporating sufficient structural integrity to hold said anode wires in place under tension.

24. The radiation detector method of claim 23 wherein said anode wires are electrically isolated from said DHB.

25. The radiation detector method of claim 17 wherein said detector body has one or more of its surfaces metalized to ensure a uniform electric field within the cavity of said DHB.

26. The radiation detector method of claim 25 wherein said surfaces comprise the inner surfaces of said DHB.

27. The radiation detector method of claim 17 wherein said feed-thrus are organized in a serpentine configuration.

28. The radiation detector method of claim 17 wherein said feed-thrus are organized to compensate for the differential coefficient of expansion between the materials of said feed-thrus and the material of said DHB.

29. The radiation detector method of claim 17 wherein said feed-thrus comprise FR-4 glass-reinforced epoxy laminate sheets.

30. The radiation detector method of claim 17 wherein said feed-thrus comprise annular rings of insulating material.

31. The radiation detector method of claim 17 wherein said feed-thrus comprise annular rings of FR-4 glass-reinforced epoxy laminate.

32. The radiation detector method of claim 17 wherein said detector body comprises a gas supply fitting and threaded insert configured for preamplifier mounting.

* * * * *